United States Patent
Zhang et al.

(10) Patent No.: US 12,520,862 B2
(45) Date of Patent: Jan. 13, 2026

(54) **METHOD FOR PREPARING LUO HAN GUO SWEETENING COMPOSITION FROM *SIRAITIA GROSVENORII* AND USE THEREOF**

(71) Applicant: HUNAN NUTRAMAX INC., Changsha (CN)

(72) Inventors: Baotang Zhang, Changsha (CN); Jiazhong Tan, Changsha (CN)

(73) Assignee: HUNAN NUTRAMAX INC., Hunan (CN)

( * ) Notice: Subject to any disclaimer, the term of this patent is extended or adjusted under 35 U.S.C. 154(b) by 1284 days.

(21) Appl. No.: 17/274,153

(22) PCT Filed: Dec. 24, 2018

(86) PCT No.: PCT/CN2018/123224
§ 371 (c)(1),
(2) Date: Mar. 5, 2021

(87) PCT Pub. No.: WO2020/048049
PCT Pub. Date: Mar. 12, 2020

(65) Prior Publication Data
US 2021/0274822 A1 Sep. 9, 2021

(30) Foreign Application Priority Data
Sep. 6, 2018 (CN) .......................... 201811039595.6

(51) Int. Cl.
*A23L 27/10* (2016.01)
*A23L 2/60* (2006.01)
(Continued)

(52) U.S. Cl.
CPC ................. *A23L 27/11* (2016.08); *A23L 2/60* (2013.01); *A23L 5/273* (2016.08); *A23L 27/12* (2016.08);
(Continued)

(58) Field of Classification Search
None
See application file for complete search history.

(56) References Cited

U.S. PATENT DOCUMENTS 5,419,251 A * 5/1995 Mantius .................. A23L 27/11
100/145
6,124,442 A 9/2000 Zhou et al.
(Continued)

FOREIGN PATENT DOCUMENTS

AU 2017401069 A1 11/2018
CN 1436786 A 8/2003
(Continued)

OTHER PUBLICATIONS

"An unripe fruit will ripen faster if laced next to a ripe fruit because of" available online at https://brainly.com/question/4210609 on Jun. 26, 2017 (Year: 2017).*
(Continued)

*Primary Examiner* — Erik Kashnikow
*Assistant Examiner* — Assaf Zilbering
(74) *Attorney, Agent, or Firm* — Knobbe, Martens, Olson & Bear, LLP

(57) ABSTRACT

A method for preparing a Luo Han Guo sweetening composition from *Siraitia grosvenorii* and a use thereof. The method for extracting the sweetening composition from *Siraitia grosvenorii* preferably includes the followings: accelerating ripening of immature *Siraitia grosvenorii*, and performing juicing, extraction with pure water, removal of impurities, concentration and purification to obtain the sweetening composition. Further, the present application relates to a compound sweetener containing the sweetening composition, which can be widely used in foodstuffs, beverages, healthcare products, and daily chemicals. The contents of mogroside III, mogroside IIe, and the like in the Luo Han Guo sweetening composition are controlled so as to
(Continued)

improve the flavor thereof, and a production process for the sweetening composition uses only pure water, without use of organic solvents such as ethanol, to ensure a greener and healthier production process.

12 Claims, 2 Drawing Sheets

(51) Int. Cl.
| | |
|---|---|
| A23L 5/20 | (2016.01) |
| A23L 27/12 | (2016.01) |
| A23L 27/30 | (2016.01) |
| A23L 33/105 | (2016.01) |
| A61K 47/46 | (2006.01) |
| B01D 11/02 | (2006.01) |
| B01D 15/24 | (2006.01) |
| B01D 15/26 | (2006.01) |
| B01D 21/26 | (2006.01) |
| B01D 61/02 | (2006.01) |
| B01D 69/02 | (2006.01) |
| B01D 71/02 | (2006.01) |
| B01D 11/00 | (2006.01) |

(52) U.S. Cl.
CPC .............. *A23L 27/36* (2016.08); *A23L 33/105* (2016.08); *A61K 47/46* (2013.01); *B01D 11/0288* (2013.01); *B01D 15/247* (2013.01); *B01D 15/265* (2013.01); *B01D 21/262* (2013.01); *B01D 61/027* (2013.01); *B01D 69/02* (2013.01); *B01D 71/0215* (2022.08); *A23V 2002/00* (2013.01); *A61K 2236/15* (2013.01); *A61K 2236/31* (2013.01); *A61K 2236/331* (2013.01); *A61K 2236/39* (2013.01); *A61K 2236/53* (2013.01); *B01D 2011/002* (2013.01); *B01D 2311/02* (2013.01); *B01D 2311/2626* (2013.01); *B01D 2311/2676* (2013.01); *B01D 2325/02832* (2022.08)

(56) References Cited

U.S. PATENT DOCUMENTS

| | | | |
|---|---|---|---|
| 2011/0021456 A1 | 1/2011 | Lyndon et al. | |
| 2012/0059071 A1* | 3/2012 | Markosyan | A61K 8/97 426/590 |
| 2014/0044843 A1 | 2/2014 | Lyndon | |
| 2017/0150745 A1* | 6/2017 | Zhang | A23L 27/12 |
| 2018/0000140 A1 | 1/2018 | Lyndon | |

FOREIGN PATENT DOCUMENTS

| | | |
|---|---|---|
| CN | 1582701 A | 2/2005 |
| CN | 101177444 A | 5/2008 |
| CN | 101386636 A | 3/2009 |
| CN | 101522058 A | 9/2009 |
| CN | 101690573 A | 4/2010 |
| CN | 101007042 B | 5/2010 |
| CN | 103980335 A | 8/2014 |
| CN | 104558088 A | 4/2015 |
| CN | 103923152 B | 11/2015 |
| CN | 105713061 A | 6/2016 |
| CN | 105852172 A | 8/2016 |
| CN | 107033209 A | 8/2017 |
| CN | 107156563 A | 9/2017 |
| CN | 107708440 A | 2/2018 |
| CN | 107936079 A | 4/2018 |
| CN | 108276465 A | 7/2018 |
| CN | 108471789 A | 8/2018 |
| CN | 108473528 A | 8/2018 |
| JP | 3502587 B2 | 3/2004 |
| PT | 2061350 E * | 2/2012 ............... A23L 2/60 |
| WO | WO 2016088700 A | 6/2016 |

OTHER PUBLICATIONS

"Ceramaic Nanofiltration". Available online at https://www.inopor.com on Jul. 22, 2015 (Year: 2015).*
Fruit Phase, Small Observation (2019).
Lei et al., "Postharvest Handling Study of Luo Han Guo Bitter Fruit", Southwest China Journal of Agricultural Sciences, vol. 27, No. 1, pp. 344-388 (2014).
Zhi-Peng et al., "Research on Postharvest Respiratory Physiology in *Siraitia grosvenorii* (Swingle)", Journal of Guangxi Agric. and Biol. Science, vol. 26, No. 2, pp. 164-167 (2007).
Chaturvedula et al., "Comparative Phytochemical Studies of the Commercial Extracts of *Siraitia grosvenorii*", Journal of Pharmacy Research, Sep. 2011, 4(9): 3166-3167.
Communication pursuant to Article 94(3) EPC issued in European Application No. 18932609.3, dated Jul. 25, 2023.
Decision of Rejection issued in Chinese Application No. 201811039595.6, dated May 7, 2022.
Ding et al., "New Practical Filtration Technology 2nd Edition", Metallurgical Industry Press, Jan. 31, 2004, in 5 pages.
Extended European Search Report issued in European Application No. 18932609.3, dated Feb. 14, 2022.
Kader, A., "Postharvest Biology and Technology: An Overview—Chapter 4" In: *Postharvest Technology of Horticultural Crops*, 3$^{rd}$ Edition, Jan. 1, 2002, pp. 39-47.
Notice of Allowance issued in European Application No. 18932609.3, dated Nov. 15, 2023.
Office Action issued in Chinese Application No. 201811039595.6, dated Jul. 1, 2021.
Office Action issued in Chinese Application No. 201811039595.6, dated Dec. 9, 2021.
Reid, M.S, "Ethylene in Postharvest Technology—Chapter 16" In: *Postharvest Technology of Horticultural Crops*, 3rd Edition, Jan. 1, 2002, pp. 149-162.
Search Report issued in Chinese Application No. 201811039595.6, dated Jul. 1, 2021.
Sokalan et al., "Applications of adsorption separation resins in the pharmaceutical industry", Chemical Industry Press, Sep. 2008, 30, pp. 117-120.
Zhonghua et al., "A Minor, Sweet Cucurbitane Glycoside from *Siraitia grosvenorii*", Jun. 2009, 4(6):769-772.

* cited by examiner

METHOD FOR PREPARING LUO HAN GUO SWEETENING COMPOSITION FROM *SIRAITIA GROSVENORII* AND USE THEREOF

CROSS REFERENCE

The present application claims the priority to the Chinese patent application No. 201811039595.6 entitled "Method for preparing LUO HAN GUO sweetening composition from fruits of *Siraitia grosvenorii* and use thereof" filed on Sep. 6, 2018, the entire disclosure of which is incorporated herein by reference in its entirety.

TECHNICAL FIELD

The present invention belongs to the technical field of extraction and separation of plant active components, and more particularly, relates to a method for preparing a LUO HAN GUO sweetening composition from *Siraitia grosvenorii*, and also relates to a compound sweetener containing the LUO HAN GUO sweetening composition obtained by the above method.

BACKGROUND ART

*Siraitia grosvenorii* (Swingle) C. Jeffrey (LUO HAN GUO), formerly known as *Momordica grosvenorii*, also named as GUANG GUO MU BIE, is the fruit of a perennial vine plant of the Cucurbitaceae family. This plant is dioecious, flowers in summer and bears fruits in autumn. *Siraitia grosvenorii* is mainly produced in Guilin of Guangxi province, Yongzhou, Shaoyang and Huaihua of Hunan province, Guangdong province, etc. in China. Luo Han Guo has the varieties of QING PI GUO, CHANG TAN GUO, DONG GUA GUO, LA JIANG GUO, HONG MAO GUO, YOU TONG GUO and the like. The QING PI GUO is planted more, and seedless *Siraitia grosvenorii* (triploid seedless *Siraitia grosvenorii*, parthenocarpy seedless *Siraitia grosvenorii*) has also been planted in planting areas in recent years. *Siraitia grosvenorii* is also one of dual-use materials as a medicine and a food, which are first approved in China, and has main effects of nourishing the lungs, relieving cough, promoting the secretion of saliva or body fluid and dissipating phlegm. The main sweet components in the *Siraitia grosvenorii* are saponins with cucurbitane triterpene such as mogrol as the aglycone. These saponins include saponins (containing 4 or more glucose groups) having sweet taste, and saponins (containing 3 or less glucose groups) having no taste or having undesirable flavor and bitter taste. The saponins of *Siraitia grosvenorii* having sweet taste include 11-O-mogroside V, neo-mogroside, mogroside V, iso-mogroside V, siamenoside I, mogroside VI, mogroside IVe, mogroside IVa and the like. The saponins of *Siraitia grosvenorii* having no taste or bitter taste include *Siraitia grosvenorii* total saponins III (including mogroside III, mogroside IIIa1, mogroside IIIe, mogroside IIIe and the like), *Siraitia grosvenorii* total saponins II (including mogroside IIe, mogroside IIa, mogroside IIaI, mogroside IIe, mogroside IIb, 11-O-mogroside IIe and the like), and *Siraitia grosvenorii* total saponins I (including mogroside Ia1, mogroside Ie1 and the like). Among these saponins, mogroside V has the highest content, and mogroside V has the characteristics of good stability, almost zero calories, sweetness up to 250 to 300 times of sucrose, long duration of sweet taste, no delayed bitterness, and no delayed astringency. As a natural sweetener, mogroside V has been widely used in high-grade beverages, foods and health products, is recognized by more and more people, and plays an increasingly important role in the international background of reducing sugar.

The publication No. CN101007042B describes a method for preparing a decolorized and debitterized extract from *Siraitia grosvenorii*, wherein the *Siraitia grosvenorii* is subjected to soaking and decocting with 14 times of water, then subjected to resin absorbing and desorbing with ethanol to obtain the product. In a method for extracting mogroside V disclosed in the publication No. CN103923152B, fresh fruits of *Siraitia grosvenorii* are used as raw materials, and subjected to washing, crushing, saccharifying, extracting, then settling and centrifuging treatment, adsorbing with macroporous resin, separating, selectively adsorbing with a multiple-resin-column group, collecting the desorption solution by fractions, combining and treating in batches according to the difference in content, refining with an ion exchange resin, concentrating, recovering ethanol, refining with silica gel, concentrating and spray drying to obtain the finished product. The US patent U.S. Pat. No. 6,124,442 provides preparation of a dried composition containing mogrosides from *Siraitia grosvenorii*, comprising: mixing the liquid extract with a solution having an oxidation number, then precipitating, allowing the clarified solution to pass through a macroporous resin, eluting the resin with an alcohol, and concentrating and drying the desorption solution obtained to give a dried composition containing the triterpene glycosides. The US patent US20110021456 provides a method for preparing a light-color sweetening composition without bitter impurities from *Siraitia grosvenorii*, comprising first extracting, then clarifying, adsorbing mogrosides with a macroporous resin, desorbing with ethanol at gradient concentrations, heating to form melanoidins, and then decolorizing with an ion exchange resin. The US patent US2014044843A1 provides a method for preparing a sweet juice from *Siraitia grosvenorii*, comprising first extracting, then clarifying, and purifying the extract solution using an anion exchange resin and a cation exchange resin to obtain a sweet juice composition with pure taste.

In most of the above-mentioned inventions for preparing mogrosides, long-term storage is used to ripen the *Siraitia grosvenorii*, or enzyme preparations are added into the extract solution of the *Siraitia grosvenorii* to accelerate the process of saccharification, then a macroporous adsorption resin is used to adsorb mogrosides, an alcohol solution is used to desorb mogrosides, to play the role of concentration or purification, then colored impurities such as polyphenol flavones are removed by an ion exchange resin and meanwhile the pH is adjusted to a suitable value. In such processes, exogenous enzymes will be used, solvents such as ethanol will be used in the purification process, and the process of removing colored substances using an ion exchange resin is a chemical reaction process, which will affect other ingredients remaining in the product except mogrosides. These processes will hinder the production of extract of the fruits of organic *Siraitia grosvenorii*. Moreover, the content of mogroside III, mogroside IIe, mogroside Ia1, and the isomers of these components in the product obtained in such a process is still high, and these components have a bad taste.

SUMMARY OF THE INVENTION

A first purpose of the present invention is to provide a method for extracting a sweetening composition from *Siraitia grosvenorii*. The method comprises the following steps:

putting mature *Siraitia grosvenorii* and immature *Siraitia grosvenorii* together at a weight ratio of 1:4 to 1:8, sealing and holding at 25° C. to 38° C. for 2 to 4 days, then placing in a ventilated environment for 1 day to 4 days to obtain raw materials of *Siraitia grosvenorii*, juicing the raw materials of *Siraitia grosvenorii* to obtain juice and fruit residues, combining the juice with an extract solution obtained by extracting the fruit residues with purified water, removing impurities, concentrating and purifying, to obtain the sweetening composition.

When picking the *Siraitia grosvenorii* in a plantation, whether the fruits can be picked is basically judged based on whether or not the fruit stalk is yellow. According to experience, the yellow fruit stalk indicates that the fruit age (the growth time from fruit formation to fruit picking) of *Siraitia grosvenorii* exceeds 3 months, which meets the requirements for picking. However, most of these picked fruits are still green or only part of the peel surface is light yellow. The main sweet components in such fresh fruits, such as mogroside V, mogroside VI, 11-O-mogroside V, and iso-mogroside V, still do not reach the highest content, the fruit still contains some bitter components such as mogroside IIe, 11-O-mogroside II, and mogroside Ia1, and the content of the sour and astringent components is also very high. It usually takes about 2 weeks to increase the content of sweet taste mogrosides by the biotransformation of the *Siraitia grosvenorii*.

Preferably, the present invention ripens the green *Siraitia grosvenorii* by the ethylene produced by the mature *Siraitia grosvenorii*. The ripening method comprises the following steps: a) the mature golden-yellow *Siraitia grosvenorii* are selected and arranged together with green *Siraitia grosvenorii* in an alternating arrangement according to the proper weight, so as to ensure that the ethylene released by the mature fruits can fully contact with the green *Siraitia grosvenorii*, wherein the weight ratio of the mature *Siraitia grosvenorii* to green *Siraitia grosvenorii* is 1:4 to 1:8, and ripening is performed at 25° C. to 38° C. for 2 to 4 days in a closed environment capable of maintaining high ethylene concentration and achieving heat preservation; and b) the fruits are placed in a well-ventilated environment to store at room temperature for 1 day to 4 days, wherein the condition of air can ensure dryness of the surface of the peel, so as to prevent mildew growth, and the *Siraitia grosvenorii* can fully perform aerobic respiration, which is beneficial to the biotransformation process of the *Siraitia grosvenorii*.

Preferably, the ripening is carried out by a method of directly introducing ethylene gas. In particular, the ripening is performed under closed condition at a temperature of 25° C. to 38° C. with the ethylene concentration in the range of 500 ppm to 1500 ppm for 2 to 4 days, and then the fruits are placed in a ventilated environment to store at room temperature for 1 day to 4 days.

By ripening for 3 to 8 days as above, the unripe, sour, astringent and bitter taste of fresh fruits of *Siraitia grosvenorii* is significantly improved, and the sweet taste is significantly enhanced. The contents of bitter mogrosides and non-sweet mogrosides in fresh fruits of *Siraitia grosvenorii* are significantly reduced, wherein the contents of mogroside III and mogroside IIe can be reduced to 10% or less of the original level, and the contents of mogroside V and 11-O-mogroside V in raw materials can be increased to about 180% of the original content.

The fresh fruits of *Siraitia grosvenorii* used in the present invention can be Subgenus *Siraitia*, and Subgenus *Microlagenaria* belonging to the genus *Siraitia* of Trib. Fevilleae Pax of the Cucurbitaceae family, and can also be polyploid *Siraitia grosvenorii* and seedless *Siraitia grosvenorii*. Subgenus *Siraitia* includes *Siraitia grosvenorii* (Swingle) C. Jeffrey ex Lu et Z. Y. Zhang, mainly produced in Guangxi, Guizhou, southern Hunan, Guangdong and Jiangxi, China; and *Siraitia siamensis* (Craib) C. Jeffrey ex Zhong et D. Fang, produced in western Guangxi and southeastern Yunnan, China, and it can also be found in northern Vietnam and Thailand. Subgenus *Microlagenaria* includes *Siraitia borneensis* (Merr.) C. Jeffrey ex Lu et Z. Y. Zhang, produced in Guangdong, Yunnan (Xichou county) and Tibet (Motuo county), China, and also in Thailand and Malaysia; *Siraitia borneensis* (Merr.) C. Jeffrey ex Lu et Z Y Zhang var. *Borneensis*; *Siraitia borneensis* (Merr.) C. Jeffrey ex Lu et Z. Y. Zhang var. lobophylla A. M. Lu et Z. Y. Zhang, produced in Lvchun of Yunnan; *Siraitia borneensis* (Merr.) C. Jeffrey ex Lu et Z. Y. Zhang var. *yunnanensis* A. M. Lu et Z. Y. Zhang produced in Eshan of Yunnan; and *Siraitia taiwaniana* (Hayata) C. Jeffrey ex Lu et Z. Y. Zhang produced in Taiwan.

Organic *Siraitia grosvenorii* refers to *Siraitia grosvenorii* which is produced by strictly following organic production regulations during the cultivation and growth of *Siraitia grosvenorii*, wherein it is forbidden to use chemical substances such as any chemically synthesized pesticides, fertilizers and growth regulators, and genetic engineering and products thereof, instead, the natural law and ecological principles of the growth of *Siraitia grosvenorii* are followed, and the *Siraitia grosvenorii* has been certified by the organic food certification agency, and has been issued with the organic food certificate.

Preferably, the present invention selects QINGPIGUO, CHANGTANGUO and triploid seedless *Siraitia grosvenorii*, which are widely planted and contain high content of sweet compnents such as mogrosides in the fruits, and more preferably, organic QING PI GUO, organic CHANG TAN GUO and organic triploid seedless *Siraitia grosvenorii* are selected.

In the present invention, the extraction is a continuous countercurrent method or extraction with an extraction tank.

The *Siraitia grosvenorii* contain about 70% of water which is mainly in the pulp, and sweet components such as mogrosides are also mainly concentrated in the pulp. Therefore, most of the sweet components in *Siraitia grosvenorii* can be carried outside with the juice by means of juicing. When extracting the remaining fruit residues, the extraction time and the amount of the solvent used can be significantly reduced, and thus, the extraction is more convenient, rapid and efficient. The fruit seeds of *Siraitia grosvenorii* contain a large amount of oil and fat components. If the fruit seeds are destroyed during the process of crushing and squeezing process of *Siraitia grosvenorii*, these oil and fat components will be brought into the extract solution, which will increase the difficulty for subsequent separation and purification, and also affect the equipment and the taste of the product. By means of squeeze juicing, the integrity of the fruit seeds of *Siraitia grosvenorii* can be ensured. The obtained fruit juice is directly sent to a process subsequent to the extraction, and the fruit residues from squeeze juicing need to be dispersed before being sent to the subsequent extraction process to prevent the formation of a solid cake of fruit residues which will affect the extraction efficiency.

The fruit residues from squeezing are extracted with water by a continuous countercurrent extraction method to give an extract solution. Countercurrent extraction means that the materials and solvent move continuously at the same time, but the material and the solvent move in opposite directions during the extraction process, wherein the materials enter from a head end and exit from a terminal end, the solvent enters from the terminal end and exits from the head end, and the extraction solvent is constantly renewed, so that the materials and the solvent always maintain a good mass transfer process. The main characteristics of the continuous countercurrent extraction include short extraction time and low solvent consumption. The countercurrent extraction process of fruit residues needs a period of generally 30 to 40 min. During the extraction process, the ratio of the weight of fruit residues to the weight of purified water (material-liquid ratio w/w) is 1:1 to 1:2, and the extraction temperature is 50° C. to 90° C. The extract solution is cooled to 50° C. or lower by a plate and frame heat exchanger and sent to the next procedure. Further preferably, the temperature during the extraction is about 50° C., and the sweet components in the fruit residues can also be completely extracted without a very high temperature. The extraction time in which the fruit residues contact with purified water is 15 to 30 min, and the ratio of the weight of the fruit residues to the amount of purified water (material-liquid ratio w/w) is 1:1 during the extraction process.

According to a preferred embodiment of the present invention, in the above-mentioned continuous countercurrent method, two continuous countercurrent extractors are connected in series, and squeeze juicer is connected in series behind each countercurrent extractor. The fruit residues can be extracted countercurrently, then second juicing is performed, the fruit residues from the second juicing (the first juicing refers to the process of crushing and squeeze juicing whole fresh fruits of *Siraitia grosvenorii* to produce fruit juice and fruit residues) are mechanically dispersed and then extracted countercurrently, and then final juicing is carried out to give waste residues having no sweet taste. In this method, the fruit residues undergoing the second juicing allows water containing sweet components at a low concentration to enter the fruit residues more easily, thereby significantly shortening the extraction time.

In a preferred embodiment of the present invention, a multi-functional extraction tank can also be used to extract the fruit residues. The extraction is performed 2 to 3 times, each extraction time is 0.5 to 1.5 h, the extraction temperature is 80° C. to 100° C., and the material-liquid ratio (w/w) of each extraction is 1:1 to 1:2. The extract solution is filtered by a 200-mesh steel sieve at the bottom of the extraction tank, cooled by a plate and frame heat exchanger and sent to the subsequent process.

In the present invention, the impurity removal specifically comprises the following steps: a) centrifuging to remove pulp tissues from the extract solution; b) filtering the centrifugal solution using a ceramic membrane with a pore size of 50 to 100 nm to obtain a filtrate; and c) adsorbing impurities in the filtrate using a macroporous adsorption resin chromatography column.

A large amount of pulp tissues remain in the fruit juice obtained by squeeze juicing the *Siraitia grosvenorii* and the extract solution. If filtering is directly performed using a ceramic membrane, the burden on the ceramic membrane will increase and the frequency of cleaning the ceramic membrane will significantly increase. Therefore, these pulp tissues must be removed. Centrifugation methods are commonly used, and a horizontal screw centrifuge, a dish centrifuge, and a tube centrifuge can be used. Preferably, a horizontal screw centrifuge is used for centrifugation at a speed of 2000 to 3000 r/min. The horizontal screw centrifuge has a suitable rotation speed, a large processing capacity, convenient cleaning, and can significantly remove pulp tissues.

In order to remove substances such as suspended particles, protopectin, plant fibers, macromolecular proteins, macromolecular polysaccharides and pectin in the fruit juice obtained by squeeze juicing and the extract solution, a ceramic membrane is used for filtration. Preferably, a ceramic membrane with a pore size of 50 to 100 nm is used for filtration, and the temperature of the liquid to be filtered is controlled at 50° C. or lower. The ceramic membrane with this pore size can significantly retain macromolecular substances and water-insoluble components, while the sweet components of *Siraitia grosvenorii* can pass through the ceramic membrane, thereby removing part of impurities.

In the present invention, the step of "adsorbing impurities in the filtrate using a macroporous adsorption resin chromatography column" specifically comprises the following steps:
  a) adsorbing the substances (impurities with undesirable taste such as mogroside III, mogroside IIe, and mogroside Ia1) in the filtrate that are weaker in polarity than the main sweet components of the fruits of *Siraitia grosvenorii* using a non-polar macroporous adsorption resin chromatography column or a weakly polar macroporous adsorption resin chromatography column, and starting to collect the effluent when mogroside V occurs in the effluent;
  b) adsorbing the impurities having relatively strong polarity such as polyphenols and organic acids in the effluent collected in step a) using a polar macroporous adsorption resin chromatography column, and collecting the effluent by fractions; and
  c) washing the chromatography column undergoing step b) with purified water, collecting the water washing solution by fractions, selectively combining the water washing solution with the effluent collected in step b), concentrating and purifying the components with good taste, and discarding the components with undesirable taste.

The solution penetrating the ceramic membrane is sent to a macroporous adsorption resin chromatography column to further remove impurities and purify the sweet components of *Siraitia grosvenorii*. In general, macroporous resins can adsorb mogrosides, but the adsorption capacities are different. Non-polar and weakly polar macroporous adsorption resins have relatively large adsorption capacities to mogrosides, and the adsorption capacities of medium-polar and polar macroporous adsorption resins are relatively small. With respect to the sweet components in *Siraitia grosvenorii*, non-polar or weakly polar macroporous adsorption resins are more likely to adsorb flavonoids having smaller polarity, fatty acids slightly soluble in water, and terpenoids having no sweet taste or even bitter taste such as triterpenoid aglycones of mogrosides, *Siraitia grosvenorii* total saponins I, *Siraitia grosvenorii* total saponins II, and *Siraitia grosvenorii* total saponins III.

Wherein, the non-polar macroporous adsorption resin is preferably type D101 and/or LX-60. The weakly polar macroporous adsorption resin is preferably type HPD-722 and/or AB-8. The polar macroporous resin is preferably type LX-17, and more preferably LX-17 with a mesh number of 60 to 120.

The volume-to-mass ratio (L/kg) of the amount of resin in the non-polar macroporous adsorption resin column to the total amount of the *Siraitia grosvenorii* is preferably 1:2 to 1:5, and the flow rate is preferably 1 to 3 BV/h.

The volume-to-mass ratio (L/kg) of the amount of resin in the polar macroporous adsorption resin column to the mogroside V in the solution loaded on the column is preferably 50:1 to 200:1.

In the case that the non-polar or weakly polar macroporous adsorption resin chromatography column has already adsorbed a large amount of mogroside V, mogroside V has begun to occur in the effluent, and the adsorption capacity of the resin column to mogroside V is tending to be saturated, the ceramic membrane filtrate is continued to be loaded on the column, and the resin chromatography column can still adsorb the non-sweet components of *Siraitia grosvenorii*. After the mogroside V reaches saturation in the resin, as the filtrate is continued to be loaded on the column, more impurities are adsorbed, and the mogroside V adsorbed in the resin will be replaced by other impurities. The effluent and the column loading solution of the same volume are taken, auxiliary materials are added to them with the same weight, and then the mixture is concentrated and dried. It is found that the content of mogroside V and 11-O-mogroside V in the effluent increased significantly, while the content of mogroside III and mogroside IIe reduced significantly. Moreover, compared with the column loading solution, the taste of the effluent has obviously less bitterness and delayed bitterness which can be felt at the base of the tongue. The effluent is collected when momordoside V occurs until the corresponding filtrate completely passed through the column.

In the present invention, a polar macroporous adsorption resin column is used to adsorb the impurities having strong polarity in the effluent described above. The ratio of the resin volume (L) to the weight (kg) of mogroside V in the column loading solution is 50:1 to 200:1, the flow rate is 1 to 3 BV/h, then the polar macroporous adsorption resin chromatography column is washed with purified water, and the fractions of the effluent and the water washing solution were collected. Preferably, the type of the polar macroporous resin is LX-17, and more preferably, the polar macroporous resin chromatography column equipped with the type LX-17 having a mesh number of 60 to 120 is used to adsorb impurities.

Most of the impurities in the effluent collected from these non-polar or weakly polar resins are polyphenols, some organic acids, some flavonoid glycosides having strong polarity, some small molecular proteins, some peptides and some amino acids and the like. The impurity components having strong polarity will be adsorbed by the polar macroporous adsorption resin, and they are difficult to be dyesorbed b water. The monosaccharides, disaccharides and some amino acids in the sweet components of *Siraitia grosvenorii* are not easy to be adsorbed, and they are easy to be carried in water solution to directly flow out. The mogrosides in the sweet components of *Siraitia grosvenorii* can be adsorbed by the polar macroporous resin, and can also be desorbed by the water solution, so they are dynamically adsorbed with the polar macroporous resin and desorbed into the water solution, thus the polar macroporous adsorption resin can play a role of chromatography purification of the mogrosides. By selectively combining the collected fractions with high content of mogroside V and the like, and removing the collected fractions with high content of mogroside III and mogroside IIe having undesirable taste, the content of the components affecting the taste in the product are further reduced.

The "concentration and purification" in the present invention specifically comprises the following step: purifying the impurities-removed solution using a nanofiltration membrane with a pore size of 1 to 2 nm. The materials of the nanofiltration membrane are generally cellulose acetate, sulfonated polysulfone, sulfonated polyethersulfone, polyvinyl alcohol, polyamide, ceramics, metals and the like. Preferably, a ceramic film having a pore size of 1 to 2 nm is used. Most water, inorganic salts, amino acids, monosaccharides, disaccharides, organic acids and the like are removed.

After the nanofiltration concentration, the nanofiltration membrane retentate solution still contains inorganic salts, amino acids, monosaccharides, disaccharides, organic acids and the like. Generally, the concentrated solution needs to be diluted again with an appropriate amount of purified water, and then concentrated and purified by nanofiltration. The inorganic salts, amino acids, monosaccharides, disaccharides, organic acids and the like can only be removed by repeating the process for many times. More preferably, purified water 2 times of the volume of the concentrated solution is added each time, and the process is repeated for 1 to 4 times.

Generally, the solid content (w/w) of the concentrated solution obtained by the nanofiltration membrane retention is only 10% to about 20%. If the water content is too high, it is easy to breed microorganisms and not easy to be stored. Therefore, it is necessary to use other concentration methods to make the concentrated solution thicker and more convenient for storage and transportation. In a preferred embodiment of the present invention, a multifunctional vacuum concentration tank is used to concentrate the retentate solution into an extract of 60 Brix to 70 Brix at a temperature of about 65° C. under a vacuum degree of about −0.08 MPa.

In order to meet the needs of the market, the concentrated solution need to be further dried to obtain a powder or a solid. Preferably, a centrifugal spray drying tower is used for drying, the solid content of the feed is about 30%, the rotational speed of an atomizer is 20,000 r/min, the inlet air temperature is 180° C., the outlet air temperature is 95° C., and a LUO HAN GUO sweetening composition powder with a packing density (bulk density) of 20 g/100 ml to 50 g/100 ml is obtained. Alternatively, a vacuum drying box is used for drying, the solid content of the feed is about 50%, the temperature is about 65° C., the vacuum degree is about −0.09 MPa, and the obtained LUO HAN GUO sweetening composition is in the form of an internally fluffy irregular solid. A vacuum freeze dryer, a boiling dryer, a circulating hot air dryer and the like may also be used for drying.

The method of the present invention is suitable for large-scale production of a LUO HAN GUO sweetening composition, and is also suitable for production of an organic LUO HAN GUO sweetening composition from organic *Siraitia grosvenorii* materials. Different batches and specifications of LUO HAN GUO sweetening compositions produced from the same raw materials (common *Siraitia grosvenorii* is distinguished from organic *Siraitia grosvenorii*) can be mixed, so as to meet the market requirements for specific content (such as 25% of mogroside V, 80% of mogroside V and the like).

A second purpose of the present invention is to provide a compound sweetener (composite sweetener). The compound sweetener may be a composition A or a mixture of a composition A and a composition B as follows:

composition A: a LUO HAN GUO sweetening composition obtained from the raw material of *Siraitia grosvenorii* by the method described above as "a method for preparing a LUO HAN GUO sweetening composition from *Siraitia grosvenorii*", the main components of the sweetening composition comprising 10% to 85% of mogroside V, 0.2% to 2% of mogroside VI, 1% to 12% of 11-O-mogroside V, 0.5% to 5% of isomogroside V, 0.1% to 3% of siamenoside I, 0.1% to 3% of mogroside IVa, 0.2% to 3% of mogroside IVe, 0% to 12% of sucrose, 0% to 8% of fructose, 0% to 6% of glucose, 0% to 10% of mannitol, mogroside III ≤0.5%, and mogroside IIe ≤0.1%, and composition B: one or more ingredients, which may be sweeteners, essences, spices, flavoring agents, pigments, plant extracts, excipients, and the like.

Preferably, the compound sweetener is composition A, and the raw materials used are common *Siraitia grosvenorii* such as QING PI GUO, CHANG TAN GUO and triploid seedless *Siraitia grosvenorii*.

More preferably, the compound sweetener is composition A, and the raw materials used are organic *Siraitia grosvenorii* such as organic QING PI GUO, organic CHANG TAN GUO and organic triploid seedless *Siraitia grosvenorii*.

In some preferred embodiments, the compound sweetener is component A, containing 75% to 83% of mogroside V, 0.4% to 1% of mogroside VI, 8% to 12% of 11-O-mogroside V, 2.5% to 4% of isomogroside V, 1.5 to 2% of siamenoside I, 0.5% to 2% of mogroside IVa, 1% to 2% of mogroside IVe, 0% of mogroside III, 0% of mogroside IIe, and 0% of sucrose, fructose, glucose and mannitol. In the compound sweetener, the content of *Siraitia grosvenorii* total mogroside III and *Siraitia grosvenorii* total mogroside II having foreign flavor and bitter taste is basically 0. The compound sweetener does not contain sugars having calories such as monosaccharides and disaccharides, and has the characteristics of high sweetness, pure sweet taste, no foreign flavor, and ultra-low calories.

In some preferred embodiments, the compound sweetener was component A, containing 47% to 54% of mogroside V, 1% to 1.6% of mogroside VI, 5% to 8% of 11-O-mogroside V, 2.5% to 4% of isomogroside V, 1.5 to 2% of siamenoside I, 0.5% to 2% of mogroside IVa, 1% to 2% of mogroside IVe, mogroside III ≤0.2%, 0% of mogroside IIe, 0.1% to 1% of sucrose, 0.1% to 1% of fructose, 0.1% to 1% of glucose, and 0.1% to 1% of mannitol. The compound sweetener still contains a trace amount of *Siraitia grosvenorii* total mogroside III and *Siraitia grosvenorii* total mogroside II, so the retention of a small amount of sugars such as sucrose, fructose, glucose and mannitol can enhance the pre-sweet taste of the compound sweetener and can reduce undesirable flavor and make the taste closer to sucrose.

In some preferred embodiments, the compound sweetener is component A, containing 23% to 28% of mogroside V, 0.2% to 0.6% of mogroside VI, 2% to 4% of 11-O-mogroside V, 1% to 2% of isomogroside V, 0.3 to 1% of siamenoside I, 0.5% to 1% of mogroside IVa, 0.5% to 1% of mogroside IVe, mogroside III ≤0.5%, mogroside IIe ≤0.1%, 2% to 6% of sucrose, 2% to 4% of fructose, 1% to 4% of glucose, and 1% to 4% of mannitol. The compound sweetener still contains a small amount of *Siraitia grosvenorii* total mogroside III and *Siraitia grosvenorii* total mogroside II, so the retention of an appropriate amount of sugars such as sucrose, fructose, glucose and mannitol contained in the raw materials of *Siraitia grosvenorii* can make the pre-sweet taste of the compound sweetner stronger, and can play the role of properly reducing bitterness, masking undesirable flavor, and making the taste closer to sucrose.

In a preferred embodiment of the present invention, the sweetener may exist in a form of powder, and the packing density (bulk density) of the powder is 20 g/100 ml to 50 g/100 ml. Within such a bulk density range, the powder of the sweetener can quickly dissolve in water, and 1 g of the powder can completely dissolve in 100 ml of water at room temperature within 30 to 50 seconds. The powder color varies from yellow to light yellow, then to off-white color and finally to pure white with the content of mogroside V in the sweetening composition becomes from a low level to a high level. The LUO HAN GUO sweetening composition may also exist in a liquid form. The liquid color varies from brown to yellow, then to light yellow, and finally to colorless according to the low to high content of mogroside V in the sweetening composition. Preferably, the LUO HAN GUO sweetening composition is in the form of a water solution of 60 to 70 Brix. The sweetening composition may also be present in an irregular solid form, preferably in the form of an internally fluffy solid.

A person skilled in the art can add the above-mentioned compound sweetener into foods, beverages, health products, daily chemicals or medicine according to need.

That is, the third purpose of the present invention is to provide foods, beverages, health products, daily chemicals, medicines, and the like containing the sweetening composition described above.

The present invention effectively controls the content of mogroside III and mogroside IIe by a specific preparation method, so that the LUO HAN GUO sweetening composition has better flavor. Moreover, only purified water is used and no organic solvents such as ethanol and the like are used in the preparation of the sweetening composition of the present invention, so the production process is green and healthy.

SPECIFIC MODES FOR CARRYING OUT THE EMBODIMENTS

Figure 1:
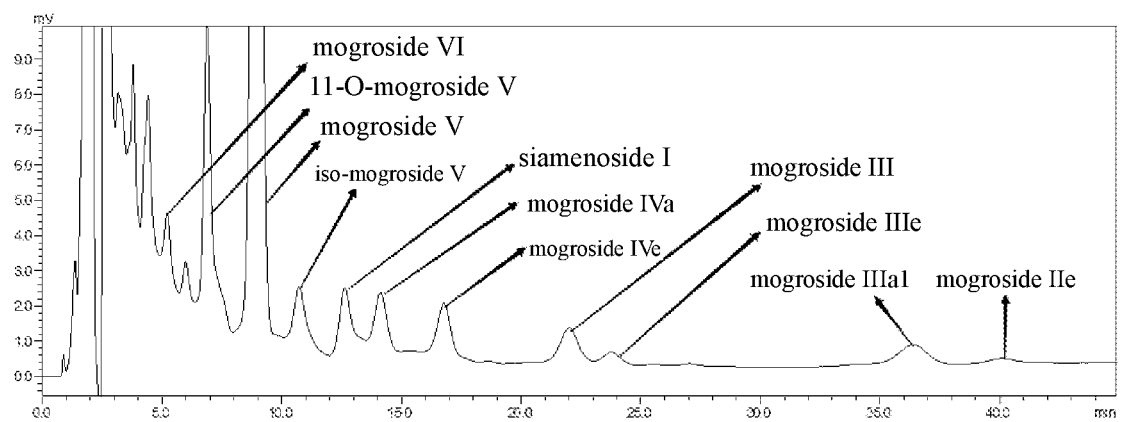
FIG. 1 is a HPLC chromatogram of the powder obtained in Comparative Example 1.
Figure 2:
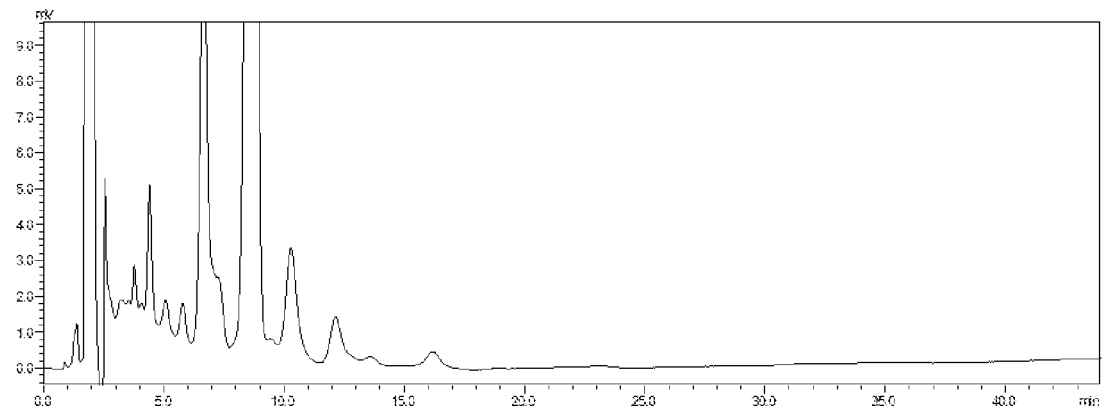
FIG. 2 is a HPLC chromatogram of the sweetening composition obtained in Example 1.
Figure 3:
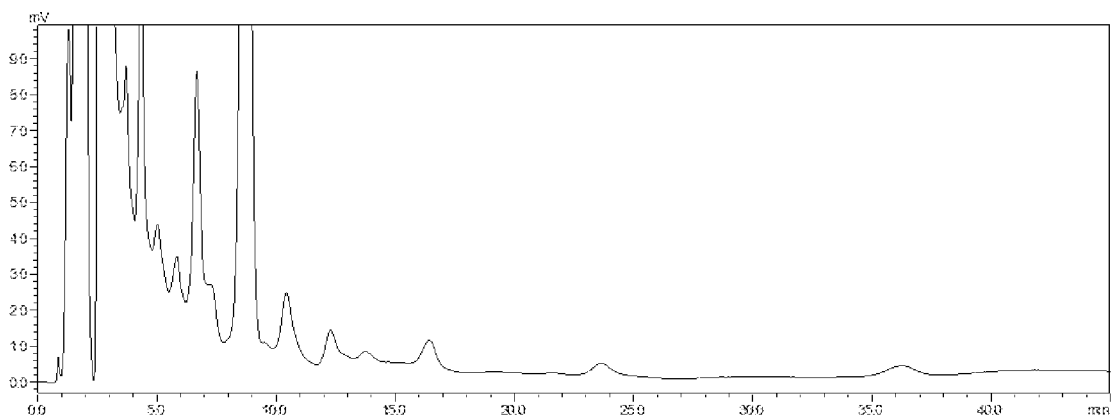
FIG. 3 is a HPLC chromatogram of the sweetening composition obtained in Example 2.
Figure 4:
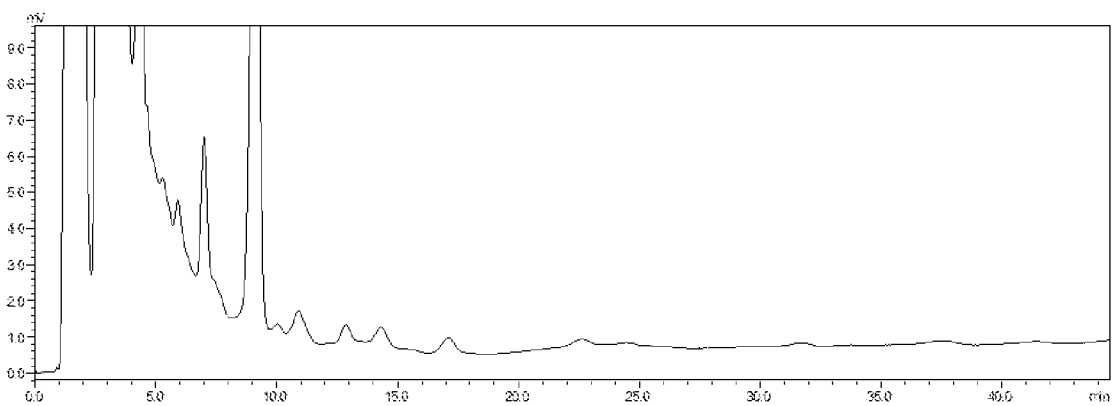
FIG. 4 is a HPLC chromatogram of the sweetening composition obtained in Example 3.

The specific embodiments of the present invention will be described in further detail in combination with examples. The following examples are used to illustrate the present invention, but not to limit the scope of the present invention.

Example 1

The present Example provides a method for preparing a LUO HAN GUO sweetening composition from *Siraitia grosvenorii*, specifically comprising the following steps:

1) Ripening: 300 kg of mature golden-yellow fruits of *Siraitia grosvenorii* were selected and arranged together with 1200 kg of green fruits (with fruit age greater than 3 months) of *Siraitia grosvenorii* in an alternating arrangement according to the weight ratio of 1:4, so as to ensure that the ethylene released by the mature fruits can fully contact with the green fruits of *Siraitia grosvenorii*. The fruits of *Siraitia grosvenorii* were covered with a plastic film thereon to separate the fruits from the outside air, thereby maintaining the high concentration of ethylene and maintaining the temperature. After ripening at a temperature of 25° C. to 38° C. for 3 days, the covered plastic film was removed, ripening was performed again for 3 days under the condition of good ventilation and room temperature, new golden-yellow fruits of *Siraitia grosvenorii* were selected for ripening the next batch, a few of green fruits that were not ripened were selected to be ripened in the next batch, and the remaining 1200 kg of fruits were sent to the juicing procedure.

2) Juicing: a squeeze juicer was used to squeeze the *Siraitia grosvenorii*, and meanwhile the integrity of the fruit seeds of *Siraitia grosvenorii* was ensured. The obtained 410 kg of fruit juice with a sugar degree of 16 Brix was sent to a ceramic membrane for filtering, and the obtained cake of fruit residues was mechanically dispersed to prevent agglomeration.

3) Extraction: 790 kg of the dispersed fruit residues were sent to a combined equipment, which comprises a continuous countercurrent extractor unit A, a juicer A, a continuous countercurrent extractor unit B, and a juicer B connected sequentially in series. The fruit residues were subjected to countercurrent extraction, then juiced, subjected to countercurrent extraction again, and finally juiced to obtain waste residues of *Siraitia grosvenorii* having no sweet taste. The extraction temperature was 50° C., the extraction time in which the fruit residues contact with purified water was 20 minutes, and the amount of the purified water used for the extraction was 790 L.

4) Centrifugation: the fruit juice obtained by squeeze juicing the *Siraitia grosvenorii* and the extract solution were centrifuged by a horizontal screw centrifuge having a drum with an inner diameter of 400 mm at a rotation speed of 3000 r/min.

5) Filtration: the centrifuged solution was filtered with a ceramic membrane having a pore size of 50 nm, and the temperature of the solution to be filtered was controlled at 50° C. or lower.

6) Adsorption of impurities: the filtrate was allowed to pass through a stainless steel chromatography column at a flow rate of 2 BV/h. The chromatography column was packed with 400 L of non-polar macroporous adsorption resin of type D101, and the temperature of the filtrate loaded on the column was about 40° C. At the beginning of the column loading, sweet components such as mogroside V, 11-O-mogroside V, and siamenoside I would be adsorbed in the resin. The main components of the liquid flowing out of the chromatography column were sugars, organic acids, inorganic salts, amino acids and the like, and these effluents can be processed into syrup as other commodities. When mogroside V began to be eluted and present in the effluent, the effluent was collected until the filtrate completely passed through the chromatography column, the chromatography column was washed with about 450 L of purified water, and the effluents were collected and combined, totaling 1200 L.

These effluents were allowed to pass through a stainless steel chromatography column at a flow rate of 0.5 BV/h. The chromatography column was packed with 1200 L of polar macroporous adsorption resin of type LX-17 with a mesh number of 80. The fractions of the effluent from the polar macroporous resin chromatography column were collected with 300 L as a fraction, totaling four fractions. After completion of the column loading, 2400 L of purified water was used for washing at a flow rate of 1 BV/h, and the fractions of the water washing solution were collected with 300 L as a fraction, totaling eight fractions. According to the sequential order of collection, the effluent and the water washing solution were named as the first fraction, the second fraction, and so on to the twelfth fraction. The first and second fractions did not contain mogrosides, and the main components were monosaccharides, disaccharides and the like, which can be concentrated into syrup as other commodities. The seventh, the eighth and the ninth fractions were combined, totaling 900 L.

7) Nanofiltration: the 900 L of combined liquid was subjected to nanofiltration using a ceramic membrane with a pore size of 1 nm. Concentration was performed until the retentate solution was about 100 L, 200 L of purified water was added for diluting, and nanofiltration was continued to concentrate to about 100 L. The process of dilution and then concentration was repeated for 3 times more to obtain 100 L of colorless transparent liquid.

8) Concentration and drying: a multi-functional vacuum concentration tank was used to further concentrate the 100 L of liquid at a temperature of about 65° C. and the vacuum degree of about −0.08 MPa, until the solid content of the feed was 30%, and an atomizer was run with a rotation speed of 20,000 r/min, an inlet air temperature of 180° C. and an outlet air temperature of 95° C., to obtain a pure white powder of a LUO HAN GUO sweetening composition (i.e., a sweetening composition) with a packing density (bulk density) of 26 g/100 ml and a specification of 80% of mogroside V.

The remaining third to sixth fractions and tenth to twelfth fractions from the impurity adsorbing process of step 6) were combined, totaling 2100 L, and the resultant was sent to the nanofiltration process and then concentrated and dried to obtain a product containing about 35% of mogroside V; or each fraction can be separately subjected to nanofiltration, concentration, and drying to obtain products with different specifications containing 10% to 65% of mogroside V. These fractions can also be combined, and added to the next batch to reload on the polar resin column to obtain a product with a higher content.

Example 2

The present Example provides a method for preparing a LUO HAN GUO sweetening composition from *Siraitia grosvenorii*, specifically comprising the following steps:

1) Ripening: 250 kg of mature golden-yellow fruits of *Siraitia grosvenorii* were selected and arranged together with 1000 kg of green fruits (with fruit age greater than 3 months) of *Siraitia grosvenorii* in an alternating arrangement according to the weight ratio of 1:4, so as to ensure that the ethylene released by the mature fruits can fully contact with the green fruits of *Siraitia grosvenorii*. The fruits of *Siraitia grosvenorii* were covered with a plastic film thereon to separate the fruits from the outside air, thereby maintaining the high concentration of ethylene and maintaining the temperature. After ripening at a temperature of 25° C. to 38° C. for 2 days, the covered plastic film was removed, ripening was performed again for 2 days under the condition of good ventilation and room temperature, new golden-yellow fruits of *Siraitia grosvenorii* were selected for ripening the next batch, a few of green fruits that were not ripened were selected to be ripened in the next batch, and the remaining 1000 kg of fruits were sent to the juicing procedure.

2) Juicing: a squeeze juicer was used to squeeze the *Siraitia grosvenorii*, and meanwhile the integrity of the fruit seeds of *Siraitia grosvenorii* was ensured. The obtained 350 kg of fruit juice with a sugar degree of 17 Brix was sent to a ceramic membrane for filtering, and the obtained cake of fruit residues was mechanically dispersed to prevent agglomeration.

3) Extraction: 650 kg of the dispersed fruit residues were sent to a continuous countercurrent extractor unit. The extraction time in which the fruit residues contacted with purified water was 40 minutes, and the purified water used in the extraction process was 650 L. The extraction temperature was 70° C., and the extract solution was cooled to 50° C. or lower by a plate and frame heat exchanger.

4) Centrifugation: the fruit juice obtained by squeeze juicing the *Siraitia grosvenorii* and the extract solution were centrifuged by a horizontal screw centrifuge having a drum with an inner diameter of 400 mm at a rotation speed of 2500 r/min.

5) Filtration: the centrifuged solution was filtered with a ceramic membrane having a pore size of 50 nm, and the temperature of the solution to be filtered was controlled at 50° C. or lower.

6) Adsorption of impurities: the filtrate was allowed to pass through a stainless steel chromatography column at a flow rate of 1.5 BV/h., The chromatography column was packed with 300 L of weakly polar macroporous adsorption resin of type HPD-722, and the temperature of the filtrate loaded on the column was about 40° C. At the beginning of the column loading, sweet components such as mogroside V, 11-O-mogroside V, and siamenoside I would be adsorbed in the resin. The main components of the liquid flowing out of the chromatography column were sugars, organic acids, inorganic salts, amino acids and the like, and these effluents can be processed into syrup as other commodities. When the mogroside V began to be eluted and present in the effluent, the effluent was collected until the filtrate completely passed through the chromatography column, the chromatography column was washed with about 450 L of purified water, and the effluents were collected and combined, totaling 1050 L.

These effluents were allowed to pass through a stainless steel chromatography column at a flow rate of 1 BV/h. The chromatography column was packed with 1000 L of a polar macroporous adsorption resin of type LX-17 with a mesh number of 60. The first 1000 L of the effluent did not contain mogrosides, and the main components were monosaccharides, disaccharides and the like, which can be concentrated into syrup as other commodities. The last 400 L of the effluent was collected. After completion of the column loading, 2000 L of purified water was used for washing at a flow rate of 2 BV/h, and the water washing solution was collected. The last 400 L of the effluent was combined with the entire water washing solution, totaling 2400 L.

7) Nanofiltration: 2400 L of the above combined liquid was subjected to nanofiltration using a ceramic membrane with a pore size of 2 nm. Concentration was performed until the retentate solution was about 100 L, 200 L of purified water was added for diluting, and nanofiltration was continued to concentrate to about 100 L. The process of dilution and then concentration was repeated for 2 times more to obtain 100 L of slightly yellow transparent liquid.

8) Concentration and drying: a multi-functional vacuum concentration tank was used to further concentrate the 100 L of liquid at a temperature of about 65° C. and the vacuum degree of about −0.08 MPa, until the solid content of the feed was 30%, and an atomizer was run with a rotation speed of 18,000 r/min, an inlet air temperature of 180° C. and an outlet air temperature of 95° C., to obtain an off-white powder of a LUO HAN GUO sweetening composition with a packing density (bulk density) of 33 g/100 ml and a specification of 50% of mogroside V.

Example 3

The present Example provides a method for preparing a LUO HAN GUO sweetening composition from *Siraitia grosvenorii*, specifically comprising the following steps:

1) Ripening: 320 kg of mature golden-yellow fruits of *Siraitia grosvenorii* were selected and arranged together with 1600 kg of green fruits (with fruit age greater than 3 months) of *Siraitia grosvenorii* in an alternating arrangement according to the weight ratio of 1:5, so as to ensure that the ethylene released by the mature fruits can fully contact with the green fruits of *Siraitia grosvenorii*. The fruits of *Siraitia grosvenorii* were covered with a plastic film thereon to separate the fruits from the outside air, thereby maintaining the high concentration of ethylene and maintaining the temperature. After ripening at a temperature of 25° C. to 38° C. for 3 days, the covered plastic film was removed, ripening was performed again for 1 day under the condition of good ventilation and room temperature, new golden-yellow fruits of *Siraitia grosvenorii* were selected for ripening the next batch, a few of green fruits that were not ripened were selected to be ripened in the next batch, and the remaining 1600 kg of fruits were sent to the juicing procedure.

2) Juicing: a squeeze juicer was used to squeeze the *Siraitia grosvenorii*, and meanwhile the integrity of the fruit seeds of *Siraitia grosvenorii* was ensured. The obtained 550 kg of fruit juice with a sugar degree of 15 Brix was sent to a ceramic membrane for filtering, and the obtained cake of fruit residues was mechanically dispersed to prevent agglomeration.

3) Extraction: 1050 kg of the dispersed fruit residue was extracted for 3 times using a multi-functional extraction tank. The first extraction was performed for 1.5 h at an extraction temperature of 100° C., each of the second extraction and the third extraction was performed for 1 h at a temperature of 80° C., and the amount of purified water used for each extraction was 2100 L. The extract solution was filtered through a 200-mesh steel sieve at the bottom of the extraction tank. The extraction solutions from the first to third extraction were combined, totaling 5700 L, cooled to about 50° C. by a plate and frame heat exchanger and sent to the centrifugation procedure.

4) Centrifugation: the fruit juice obtained by squeeze juicing the *Siraitia grosvenorii* and the extract solution were centrifuged by a horizontal screw centrifuge having a drum with an inner diameter of 400 mm at a rotation speed of 3000 r/min.

5) Filtration: the centrifugal solution was filtered with a ceramic membrane having a pore size of 100 nm, and the temperature of the solution to be filtered was controlled at 50° C. or lower.

6) Adsorption of impurities: the filtrate was allowed to pass through a stainless steel chromatography column at a flow rate of 3 BV/h. The chromatography column was packed with 400 L of a non-polar macroporous adsorption resin of type LX-60, and the temperature of the filtrate loaded on the column was about 45° C. At the beginning of the column loading, sweet components such as mogroside V, 11-O-mogroside V, and siamenoside I would be adsorbed in the resin. The main components of the liquid flowing out of the chromatography column were sugars, organic acids, inorganic salts, amino acids and the like, and these effluents can be processed into syrup as other commodities. When the mogroside V began to be eluted and present in the effluent, the effluent was collected until the filtrate completely passed through the chromatography column, the chromatography column was washed with about 450 L of purified water, and the effluents were collected and combined, totaling 5400 L.

These effluents were allowed to pass through a stainless steel chromatography column at a flow rate of 2 BV/h. The chromatography column was packed with 900 L of a polar macroporous adsorption resin of type LX-17. The first 1800 L of the effluent did not contain mogrosides, and the main components were monosaccharides, disaccharides and the like, which can be concentrated into syrup as other commodities. The subsequent 3600 L of effluent was collected. After completion of the column loading, 1200 L of purified water was used for washing at a flow rate of 2 BV/h, the water washing solution was collected, and 3600 L of the effluent collected and 1200 L of the water washing solution were combined, totaling 4800 L.

7) Nanofiltration: 4800 L of the above-mentioned combined liquid was subjected to nanofiltration using a ceramic membrane with a pore size of 2 nm. Concentration was performed until the retentate solution was about 200 L, 400 L of purified water was added for diluting, and nanofiltration was continued to concentrate to about 200 L. The process of dilution and then concentration was repeated once more to obtain 200 L of yellow transparent liquid.

8) Concentration and drying: a multi-functional vacuum concentration tank was used to further concentrate the 200 L of liquid at a temperature of about 65° C. and the vacuum degree of about −0.08 MPa, until the solid content of the feed was 30%, and an atomizer was run with a rotation speed of 16,000 r/min, an inlet air temperature of 180° C. and an outlet air temperature of 95° C., to obtain a light yellow powder of a LUO HAN GUO sweetening composition with a packing density (bulk density) of 42 g/100 ml and a specification of 25% of mogroside V.

Comparative Example 1

According to the method described in Example 1 of the patent No. CN101522058A, fresh fruits of *Siraitia grosvenorii* were used to prepare triterpenoid saponins to obtain a slightly yellow powder.

The HPLC method for detecting mogroside V described in Chinese Pharmacopoeia 2015 was used for the powders obtained in Examples 1, 2 and 3 and Comparative Example 1: acetonitrile-water (23:77) as mobile phase, detection wavelength of 203 nm, column temperature of 30° C., flow rate: 1 ml/min, injection volume: 10 μl, chromatography column: C18 column (4.6 mm*150 mm, 5 μm), and the contents of mogroside VI, 11-O-mogroside V, mogroside V, iso-mogroside V, siamenoside I, mogroside IVa, mogroside IVe, mogroside III and mogroside IIe were measured.

The contents of sucrose, fructose, glucose and mannitol of the powders obtained in Examples 1, 2 and 3 and Comparative Example 1 were detected using ion chromatography (AOAC 995.13).

Purified water was added to the powders obtained in Examples 1, 2 and 3 and Comparative Example 1 to prepare solutions having the same concentration of mogroside V (the concentration mogroside V was 0.5 mg/ml). The above 4 different solutions were subjected to blind test by a delayed bitterness tasting group consisting of 20 persons (10 men and 10 women, aged 20 to 61), and then scored. The tasting method comprised: first gargling with purified water, then allowing the solution to be tasted to fully contact with the tongue and the oral cavity for 10 s, swallowing (to facilitate contact of the solution with the deep part of the base of the tongue), and scoring. Gargling was required before the next tasting, and the interval between two tasting procedures should be at least 1 min. The scoring criterion is that the weaker the delayed bitterness, the higher the score, and the stronger the delayed bitterness, the lower the score, in particular, no bitterness (10 points), unobvious bitterness (9 points, 8 points, 7 points, depending on the degree of slight bitterness, the score is different), weak bitterness (6 points, 5 points, 4 points), less bitterness (3 points, 2 points, 1 point).

The results were shown in the following table:

TABLE 1

Content results of the Examples and Comparative Example

| Items | Example 1 | Example 2 | Example 3 | Comparative Example 1 |
|---|---|---|---|---|
| Mogroside VI (% w/w) | 0.59 | 1.48 | 0.45 | 1.22 |
| 11-O-mogroside V (% w/w) | 11.34 | 6.22 | 3.15 | 5.80 |
| Mogroside V (% w/w) | 80.62 | 53.61 | 27.14 | 48.20 |
| Iso-mogroside V (% w/w) | 3.69 | 3.42 | 1.62 | 2.53 |
| Siamenoside I (% w/w) | 2.24 | 1.71 | 0.63 | 2.60 |
| Mogroside IVa (% w/w) | 0.21 | 0.63 | 0.83 | 2.25 |
| Mogroside IVe (% w/w) | 0.56 | 1.37 | 0.82 | 2.04 |
| Mogroside III (% w/w) | 0 | 0.13 | 0.35 | 1.52 |
| Mogroside IIe (% w/w) | 0 | 0 | 0 | 0.32 |
| Sucrose (% w/w) | 0 | 0.4 | 3.2 | 0 |
| Fructose (% w/w) | 0 | 0.2 | 2.5 | 0 |
| Glucose (% w/w) | 0 | 0.2 | 1.4 | 0 |
| Mannitol (% w/w) | 0 | 0.5 | 1.6 | 0 |
| Taste evaluation score | 9.5 | 8.3 | 6.1 | 5.8 |

From Table 1, and FIGS. 1 to 5, it can be seen that, 1. The LUG HAN GUO sweetening composition obtained in Examples 2 and 3 contains sugars such as sucrose, fructose, glucose and mannitol, which are not contained in Example 1. The higher the content of mogroside V, the lower the content of sugars, and the lowest content of sugars is 0%. The content of mogroside V in the Comparative Example is similar to that in Example 2, but these sugars mentioned above are not contained in the Comparative Example. A small amount of monosaccharides and disaccharides contained in the products containing about 10% to 60% of mogroside V can play the role of enriching sweetness and making the taste closer to sucrose. 2. All the Examples do not contain mogroside IIe, and the higher the content of mogroside V, the smaller the content of mogroside III. In the product obtained in Example 1 which contains mogroside V with a high content of 80.62%, the content of mogroside III is 0%, and the peaks of mogroside IIIe and mogroside IIIa1 are not seen in the chromatogram thereof. The less the content of these substances having an undesirable taste or even strong bitter taste, the higher the taste evaluation score.

Figure 5:
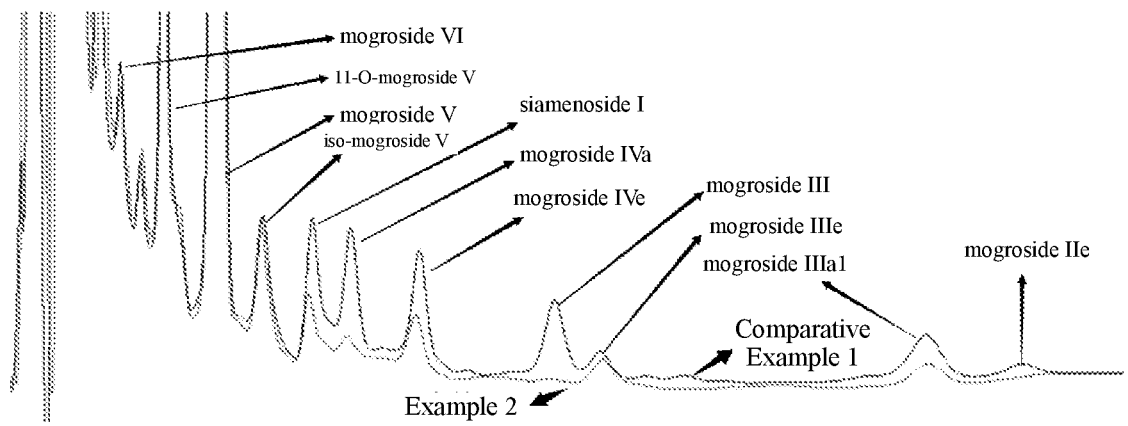
FIG. 5 shows HPLC chromatograms of the sweetening composition obtained in Example 2 and the powder obtained in Comparative Example 1.

3. The content of mogroside V in Example 2 is similar to that of Comparative Example 1. The contents of Siamenoside I, mogroside IVa and mogroside IVe that have a weaker polarity than that of mogroside V in Example 2 are lower than those in Comparative Example 1, and the Example 1 does not contain mogroside III or mogroside IIe that has a weaker polarity than mogroside IV, while the Comparative Example 1 contains mogroside III and mogroside IIe. In FIG. 5, the peak value of mogroside IIIa1 of the Example 2 is also lower than that of the Comparative Example 1, so it can be seen that the present method can reduce the content of bitter glycosides and unpalatable glycosides and facilitate the conversion thereof into mogrosides by ripening the raw materials. In the subsequent process of adsorption of impurities, the non-polar or weakly polar resin saturated with mogroside V can significantly adsorb total mogroside III and total mogroside II, reduce or even remove the components with undesirable taste, and improve the taste of the product. Meanwhile, the present method can also adsorb part of the *Siraitia grosvenorii* total mogroside IV (Siamenoside I, mogroside IVa, mogroside IVe and the like), and the bitter glycosides can be separated from the *Siraitia grosvenorii* total mogroside IV by improvements of a subsequent process, so as to develop new products.

Finally, the method of the present invention is only a preferred embodiment, and is not intended to limit the protection scope of the present invention. Any modification, equivalent replacement, and improvement made within the spirit and principle of the present invention shall be included in the protection scope of the present invention.

INDUSTRIAL APPLICABILITY

The present invention provides a method for preparing a LUO HAN GUO sweetening composition from *Siraitia grosvenorii* and use thereof. The method for extracting a sweetening composition from *Siraitia grosvenorii* according to the present invention preferably comprises the following steps: accelerating ripening of immature fruits of *Siraitia grosvenorii*, and performing the steps of juicing, extraction with purified water, removal of impurities, concentration and purification and the like to obtain the sweetening composition. The present invention also provides a compound sweetener containing the sweetening composition. The compound sweetener can be widely used in foodstuffs, beverages, healthcare products, and daily chemicals. By controlling the content of mogroside III, mogroside IIe and the like, the present invention makes the Luo Han Guo sweetening composition have better flavor. Moreover, only purified water is used and no organic solvents such as ethanol are used in the preparation of the sweetening composition of the present invention, so the production process is green and healthy, and thus the present invention has better economic value and application prospects.

What is claimed is:

1. A method for extracting a sweetening composition from *Siraitia grosvenorii*, comprising:
    putting mature *Siraitia grosvenorii* and immature *Siraitia grosvenorii* together at a weight ratio of 1:4 to 1:8, sealing and holding at 25° C. to 38° C. for 2 to 4 days, then placing in a ventilated environment for 1 day to 4 days to obtain raw materials of the *Siraitia grosvenorii*, juicing the raw materials of the *Siraitia grosvenorii* to obtain juice and fruit residues,
    combining the juice with the extract solution obtained by extracting the fruit residues with purified water, removing impurities, and concentrating and purifying, to obtain the sweetening composition,
    wherein said removing impurities comprises:
    a) centrifuging to remove pulp tissues from the extract solution;
    b) filtering the centrifugal solution using a ceramic membrane with a pore size of 50 to 100 nm to obtain a filtrate; and
    c) adsorbing impurities in the filtrate using a macroporous adsorption resin chromatography column,
    wherein said c) comprises:
    1) adsorbing substances in the filtrate that are weaker in polarity than main sweet components of *Siraitia grosvenorii* using a non-polar macroporous adsorption resin chromatography column or a weakly polar macroporous adsorption resin chromatography column, and starting to collect an effluent when a mogroside V is eluted;
    2) adsorbing the impurities of polyphenols and organic acids in the effluent collected in said 1) using a polar macroporous adsorption resin chromatography column, and collecting the effluent by fractions; and
    3) washing the chromatography column undergoing said 2) with purified water, collecting the water washing solution by fractions, selectively combining the water washing solution with the effluent collected in said 2), concentrating and purifying components with good taste, and discarding the components with undesirable taste,
    wherein a volume-to-mass ratio (L/kg) of the amount of resin in the non-polar macroporous adsorption resin column to the total amount of the *Siraitia grosvenorii* is 1:2 to 1:5, and a flow rate is 1 to 3 BV/h,
    a volume-to-mass ratio (L/kg) of the amount of resin in the polar macroporous adsorption resin column to the mogroside V in the solution loaded on the column is 50:1 to 200:1.

2. The method according to claim 1, wherein the *Siraitia grosvenorii* is Subgenus *Siraitia*, Subgenus *Microlagenaria*, polyploid *Siraitia grosvenorii* or seedless *Siraitia grosvenorii*.

3. The method according to claim 1, wherein said extracting adopts a continuous countercurrent method or extraction with an extraction tank;
    the continuous countercurrent method comprises:
    performing the continuous countercurrent method with water as a solvent, with a usage ratio of the fruit residues to water at 1:1 to 1:2, an extraction temperature of 50° C. to 90° C., and extraction time of 30 to 40 min;
    and/or, in the continuous countercurrent method, two continuous countercurrent extractors are connected in series, and each countercurrent extractor is further connected with squeeze juicer in series, so as to combine the juice and the extract solution.

4. The method according to claim 1, wherein the non-polar macroporous adsorption resin is type Zhang01 and/or LX-60; the weakly polar macroporous adsorption resin is type HPD-722 and/or AB-8; and the polar macroporous resin is type LX-17.

5. The method according to claim 1, wherein said concentrating and purifying comprises:

concentrating and purifying the impurities-removed solution using a nanofiltration membrane with a pore size of 1 to 2 nm; and the material of the nanofiltration membrane is cellulose acetate, sulfonated polysulfone, sulfonated polyethersulfone, polyvinyl alcohol, polyamide, ceramic or metal.

6. The method according to claim 2, wherein said extracting adopts a continuous countercurrent method or extraction with an extraction tank;
the continuous countercurrent method comprises:
performing the continuous countercurrent method with water as a solvent, with a usage ratio of the fruit residues to water at 1:1 to 1:2, an extraction temperature of 50° C. to 90° C., and extraction time of 30 to 40 min;
and/or, in the continuous countercurrent method, two continuous countercurrent extractors are connected in series, and each countercurrent extractor is further connected with squeeze juicer in series, so as to combine the juice and the extract solution.

7. The method according to claim 2, wherein said concentrating and purifying comprises: concentrating and purifying the impurities-removed solution using a nanofiltration membrane with a pore size of 1 to 2 nm; and the material of the nanofiltration membrane is cellulose acetate, sulfonated polysulfone, sulfonated polyethersulfone, polyvinyl alcohol, polyamide, ceramic or metal.

8. The method according to claim 3, wherein said concentrating and purifying comprises: concentrating and purifying the impurities-removed solution using a nanofiltration membrane with a pore size of 1 to 2 nm; and the material of the nanofiltration membrane is cellulose acetate, sulfonated polysulfone, sulfonated polyethersulfone, polyvinyl alcohol, polyamide, ceramic or metal.

9. The method according to claim 4, wherein said concentrating and purifying comprises: concentrating and purifying the impurities-removed solution using a nanofiltration membrane with a pore size of 1 to 2 nm; and the material of the nanofiltration membrane is cellulose acetate, sulfonated polysulfone, sulfonated polyethersulfone, polyvinyl alcohol, polyamide, ceramic or metal.

10. The method according to claim 1, wherein the collect of the effluent is started in said 1) when the mogroside V is saturated in the non-polar macroporous adsorption resin chromatography column or the weakly polar macroporous adsorption resin chromatography column and eluted from the non-polar macroporous adsorption resin chromatography column or the weakly polar macroporous adsorption resin chromatography column.

11. The method according to claim 1, wherein the non-polar macroporous adsorption resin chromatography column is used in said 1).

12. The method according to claim 1, wherein said 2) is conducted with only a purified water without using an organic solvent.

* * * * *